United States Patent
Kumar et al.

(10) Patent No.: US 11,138,072 B2
(45) Date of Patent: Oct. 5, 2021

(54) PROTECTED RUNTIME MODE

(71) Applicant: Intel Corporation, Santa Clara, CA (US)

(72) Inventors: Mohan J. Kumar, Aloha, OR (US); Murugasamy K. Nachimuthu, Beaverton, OR (US); Sarathy Jayakumar, Portland, OR (US); Sergiu D. Ghetie, Hillsboro, OR (US); Neeraj Upasani, Portland, OR (US); Ronald N. Story, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 772 days.

(21) Appl. No.: 15/852,021

(22) Filed: Dec. 22, 2017

(65) Prior Publication Data

US 2019/0196866 A1    Jun. 27, 2019

(51) Int. Cl.
  *G06F 11/14*  (2006.01)
  *G06F 11/07*  (2006.01)

(52) U.S. Cl.
  CPC ...... *G06F 11/1405* (2013.01); *G06F 11/0721* (2013.01); *G06F 11/0793* (2013.01)

(58) Field of Classification Search
  CPC ............. G06F 11/0721; G06F 11/0793; G06F 11/1405; G06F 11/1417
  USPC .......................................................... 713/1, 2
  See application file for complete search history.

(56) References Cited

U.S. PATENT DOCUMENTS

| | | | | |
|---|---|---|---|---|
| 5,657,445 A * | 8/1997 | Pearce | ................ | G06F 12/1491 710/37 |
| 5,987,604 A * | 11/1999 | Edrich | .................... | G06F 12/10 713/1 |
| 6,832,311 B2 * | 12/2004 | Morisawa | ............. | G06F 1/3203 713/1 |
| 7,707,454 B2 * | 4/2010 | Hsieh | .................. | G06F 11/1456 714/6.11 |
| 8,762,797 B2 * | 6/2014 | Serebryany | ......... | G06F 11/0793 714/702 |
| 9,311,177 B2 * | 4/2016 | Yao | .......................... | G06F 21/00 |
| 2016/0011646 A1 * | 1/2016 | Maity | .................. | G06F 1/3287 713/324 |

* cited by examiner

*Primary Examiner* — Joseph R Kudirka
(74) *Attorney, Agent, or Firm* — Patent Capital Group

(57) ABSTRACT

There is disclosed in one example a processor, including: a protected runtime mode (PRM) module to receive a PRM interrupt and to: suspend operation of a software task executing on the processor; save processor state information; place the microprocessor into PRM; access a PRM handler in a designated PRM memory region, wherein the PRM handler comprises a platform specific task; restore the processor state; and resume operation of the software task.

24 Claims, 9 Drawing Sheets

PROTECTED RUNTIME MODE

FIELD OF THE SPECIFICATION

This disclosure relates in general to the field of network computing, and more particularly, though not exclusively, to a system and method for protected runtime mode.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
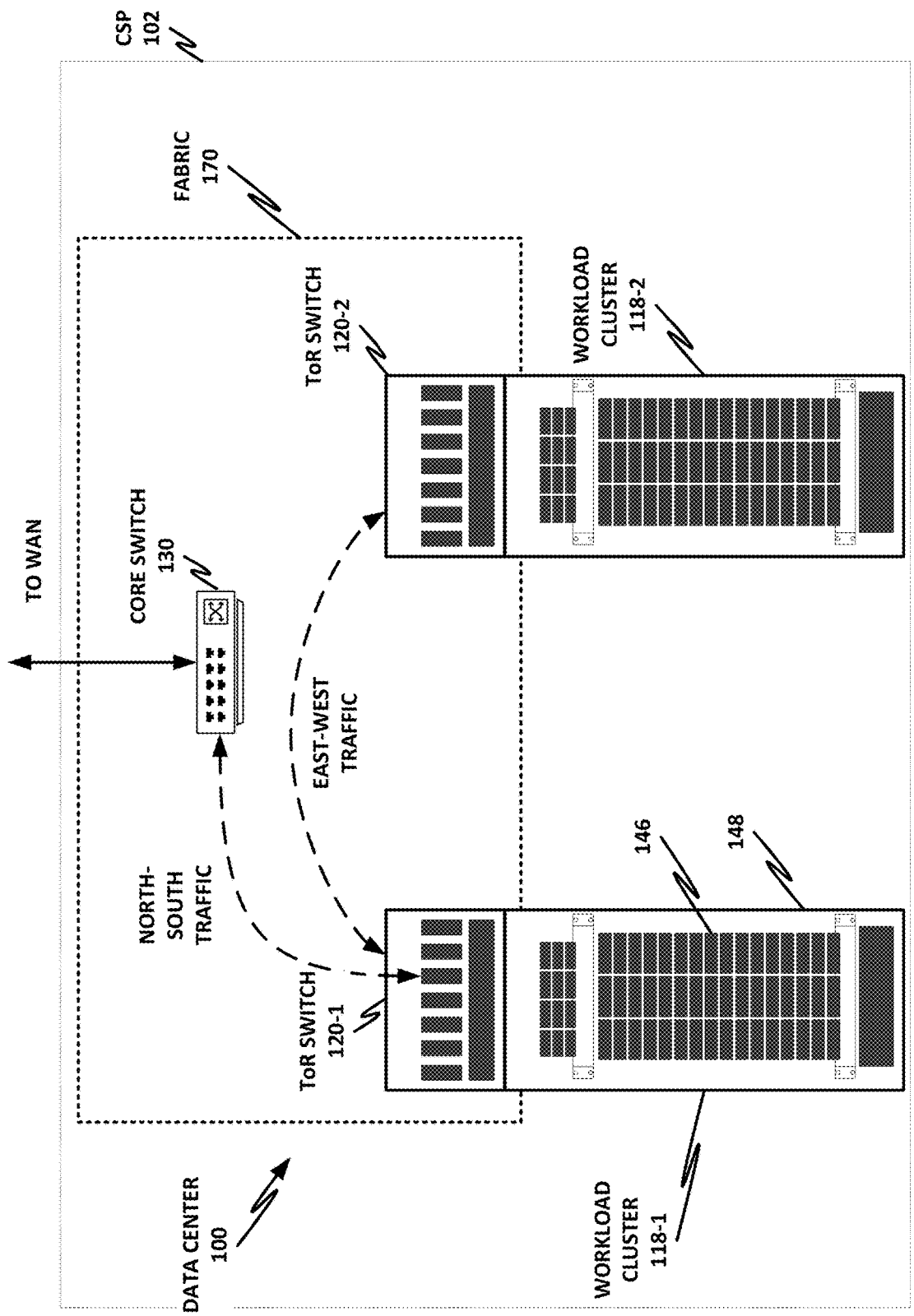
FIG. 1 is a block diagram of selected components of a data center with network connectivity, according to one or more examples of the present application.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack-mounted servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer, and/or containerization, wherein instances of network functions are provided in "containers" that are separated from one another, but that share underlying operating system, memory, and driver resources.

Most contemporary computing systems, such as those that may be found in a data center operated by a cloud service provider or other service provider, include a processor and memory, with an operating system (OS) which in a data center may provide a number of virtual machines. Contemporary computing devices also commonly include a basic input/output system (BIOS), which provides an abstraction layer between the operating system and the underlying hardware. The BIOS may include different modes. For example, a contemporary BIOS may include Advanced Configuration and Power Interface (ACPI) source language (ASL), Unified Extensible Firmware Interface (UEFI) runtime, and system management interrupt (SMI) modes. Each of these modes or environments have different purposes, capabilities, and limitations.

For example, ASL provides runtime space for handling platform events. ASL development and debugging in some cases pose special challenges because of the highly restrictive nature of ASL and the runtime environment, itself.

To overcome the restrictions of ASL, firmware or BIOS developers may resort to "tricks," like dropping into SMI mode by invoking a software SMI and providing an SMI handler to carry out the desired runtime tasks.

UEFI runtime services provide a very limited set of functionality, and may be invoked by the operating system or virtual machine monitor (VMM) page tables, thus leading to a constrained environment. This limits the ability of UEFI runtime mode to handle platform events, and thus once again, developers may resort to dropping into SMI to overcome those limitations.

SMI is a powerful mode that provides essentially unfettered access to all hardware, memory, and other system resources, including write access to locked registers. In some embodiments, SMI is used in conjunction with security attributes of an initiator (SAI), or properties used for making access decisions within a computing environment.

One limitation of the SMI mode is that the system management mode (SMM) code is not inspectable by the operating system. In other words, the SMI acts as a "black box" that the operating system cannot inspect, verify, and/or audit. Thus, the operating system vendor, and the ultimate consumer of the hardware platform hosting the BIOS, must trust that the original equipment manufacturer (OEM) that provided the BIOS has not tampered with or compromised the code. This opens the opportunity for a rogue employee of a BIOS manufacturer to introduce a backdoor, which can result in decreased system security.

Furthermore, the overuse of SMI on hardware platforms itself leads to problems. For example, a common hardware platform in a data center is a single drawer rackmount server, commonly occupying 1 to 3 rack units of space, and may include a large memory as well as some tens of cores. When a system management interrupt is issued, the BIOS pauses all of the cores in the hardware platform, executes the code in the SMI handler, and then restores the cores to operation. Thus, an SMI incurs the overhead of pausing and unpausing all of the cores in the platform, while also having the disadvantage of requiring the cores to be paused to begin with. Note that an SMI may be triggered by a single thread on a single core, but when the system enters system management mode, all of the cores must be halted to ensure that the SMI has complete access to all system resources without interference from running threads.

However, many runtime handlers do not require system management mode's powerful "open access to everything" model. Rather, these runtime handlers can often be well-served with much more limited memory access.

Thus, the present specification provides a novel protected runtime mode (PRM) including a protected runtime environment that provides some of the functionality and capabilities of an SMI handler without requiring unlimited access, and also without the need to halt all cores. Instead of the PRM entering a "broadcast" mode in which all of the cores on the hardware platform are put to sleep, the PRM handler instead has access only to a very limited region of memory. The PRM is restricted to writing to a specific BIOS-reserved area. Any attempt by the PRM code to make a call outside of the PRM's reserved environment is blocked. In one embodiment, the PRM has no write privileges to lock-bypass registers or SMM/SAI-only registers. PRM code may also be visible and auditable by the OS or VMM. Thus, the PRM code can be verified to ensure that it has not been tampered with.

Advantageously, the PRM described in this specification eliminates the need for system programmers to "cheat" and frequently enter system management mode.

The novel PRM described in this specification is similar to system management mode, but is provided in a contained environment or enclave, thus providing the following benefits relative to SMM:

PRM is able to run as non-broadcast, so that only a specified core executes the PRM code.

PRM avoids the overhead of entering and exiting compared to SMM, as it does not need to save the state of and pause every core in the system.

PRM access to memory is limited by design to a special reserved PRM region.

PRM can provide an OS-visible indication that a thread is in PRM mode.

PRM code is visible to the OS or VMM, and thus can be verified and/or audited.

PRM may be invoked in software by an interrupt using a mechanism similar to SMI. For example, in one embodiment, PRM is invoked by writing to port 0xB4 to invoke PRM. This is similar to how SMI is invoked currently, by writing to port 0xB2.

The PRM described in this specification helps with the development and maintenance of BIOS ACPI source language code. Writing in ASL is often tedious and difficult because of the limitations of the ASL specification and environment. However, with a PRM, developers need not resort to overusing SMI traps to overcome the limitations of the ASL. Rather, developers can use the PRM to achieve the desired result without taking the drastic step of entering SMM.

Advantageously, the present specification requires no changes to ASL, itself. ASL may be maintained as is, but the PRM described herein provides a secure BIOS runtime environment and a mechanism for ASL to access this secure BIOS runtime environment to a call gate mechanism. This eases ASL development and maintenance by allowing complex portions to be developed using high-level language.

The PRM described herein also enables OS or VMM code to inspect the platform firmware running in PRM, leading to a better platform security. Furthermore, by reducing or removing the use of SMM for runtime firmware, the amount of code that is not inspectable by the OS or VMM is reduced or eliminated in the trust boundary of the platform.

Embodiments of the PRM as described herein may be implemented using a protected runtime range register (PRRR). Entry into the PRM may be accomplished via a write to an input/output (I/O) port, memory mapped I/O (MMIO), or model-specific register (MSR). In many existing Intel® platforms, entry to SMM is achieved by writing to port 0xB2. To maintain similarity with SMM, the PRM of the present specification may be entered by writing to port 0xB4. Note, however, that this is a nonlimiting example. The selection of 0xB4 is advantageous because it is similar to 0xB2 used for SMI, but is a unique value, and is thus relatively easy to remember for those who are already familiar with SMM.

Unlike SMM, which must save and restore the entire processor content, PRM need only save a subset, thus providing faster entry and exit. PRM also provides only limited access to memory outside of the PRRR range. A processor in PRM can only read or write to memory within the PRRR range as marked by the BIOS/UEFI as the reserved area for PRM. In some embodiments, processor hardware is primed during boot to enforce this restriction.

Embodiments of the PRM described herein also provide an indication to the OS or VMM that a particular thread is in PRM. For example, this may include a package scoped MSR with a bit field indexed by the core or thread ID.

Figure 7:
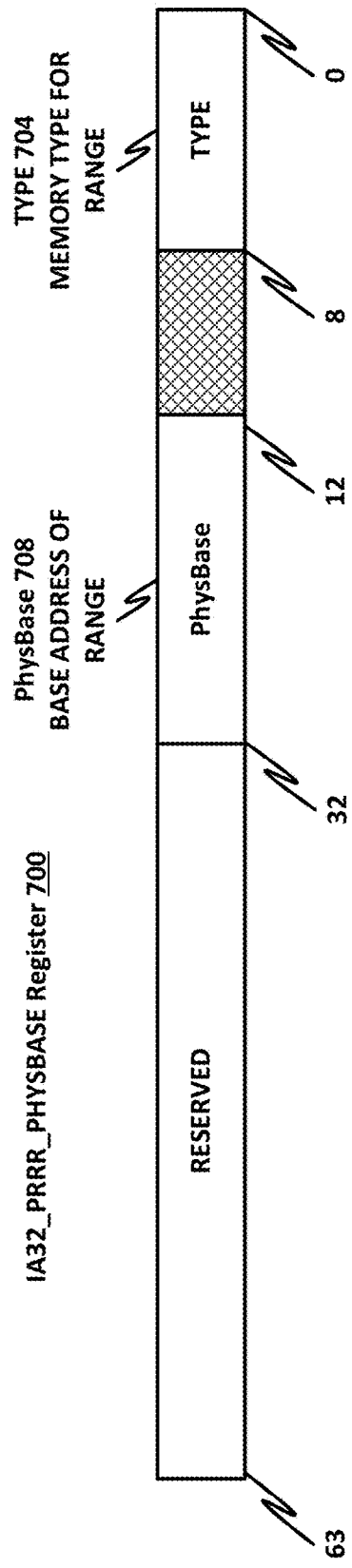
FIGS. 7-8 are block diagrams of protected runtime range registers (PRRRs), according to one or more examples of the present specification.
Figure 8:
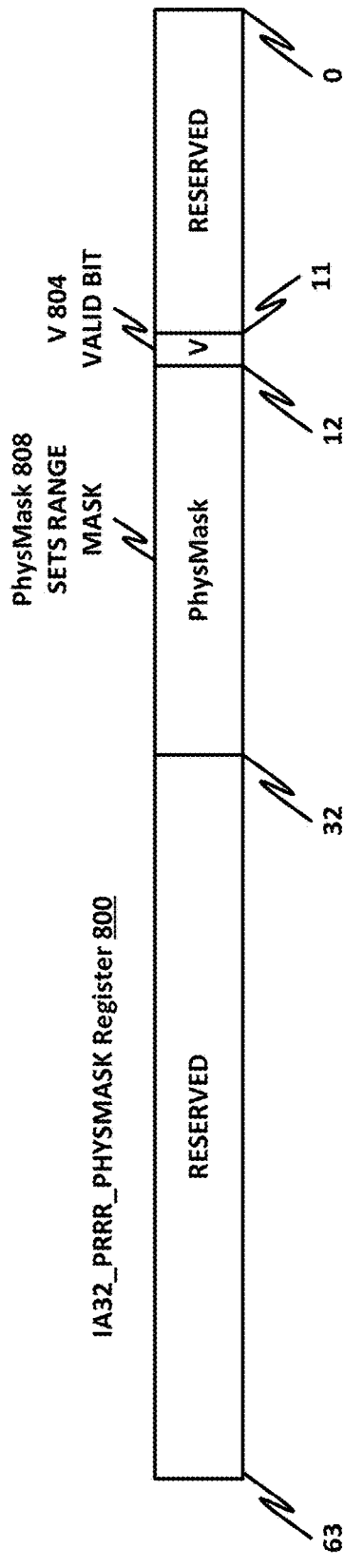

PRM is protected by the PRRR. FIGS. 7 and 8 provide examples of PRRR.

A system and method for protected runtime mode will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of selected components of a data center with connectivity to network 100 of a cloud service provider (CSP) 102, according to one or more examples of the present specification. Embodiments of network 100 disclosed herein may be adapted or configured to interoperate with protected runtime mode according to the teachings of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS). In some cases, CSP 102 may provide, instead of or in addition to cloud services, high-performance computing (HPC) platforms or services. Indeed, while not expressly identical, HPC clusters ("supercomputers") may be structurally similar to cloud data centers, and unless and except where expressly specified, the teachings of this specification may be applied to either.

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

In this illustration, workload clusters 118 are shown as modular workload clusters conforming to the rack unit ("U") standard, in which a standard rack, 19 inches wide, may be built to accommodate 42 units (42U), each 1.75 inches high and approximately 36 inches deep. In this case, compute resources such as processors, memory, storage, accelerators, and switches may fit into some multiple of rack units from one to 42.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include an Intel® Host Fabric Interface (HFI), a network interface card (NIC), a host channel adapter (HCA), or other host interface. For simplicity and unity, these may be referred to throughout this specification as a "host fabric interface" (HFI), which should be broadly construed as an interface to communicatively couple the host to the data center fabric. The HFI may couple to one or more host processors via an interconnect or bus, such as PCI, PCIe, or similar. In some cases, this interconnect bus, along with other "local" interconnects (e.g., core-to-core Ultra Path Interconnect) may be considered to be part of fabric 170. In other embodiments, the UPI (or other local coherent interconnect) may be treated as part of the secure domain of the processor complex, and thus not part of the fabric.

The interconnect technology may be provided by a single interconnect or a hybrid interconnect, such as where PCIe provides on-chip communication, 1 Gb or 10 Gb copper Ethernet provides relatively short connections to a ToR switch 120, and optical cabling provides relatively longer connections to core switch 130. Interconnect technologies that may be found in the data center include, by way of nonlimiting example, Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, or fiber optics, to name just a few. The fabric may be cache- and memory-coherent, cache- and memory-non-coherent, or a hybrid of coherent and non-coherent interconnects. Some interconnects are more popular for certain purposes or functions than others, and selecting an appropriate fabric for the instant application is an exercise of ordinary skill. For example, OPA and Infiniband are commonly used in high-performance computing (HPC) applications, while Ethernet and FibreChannel are more popular in cloud data centers. But these examples are expressly nonlimiting, and as data centers evolve fabric technologies similarly evolve.

Note that while high-end fabrics such as OPA are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies may arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in some data centers or supercomputers, Ethernet may be supplanted or supplemented by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
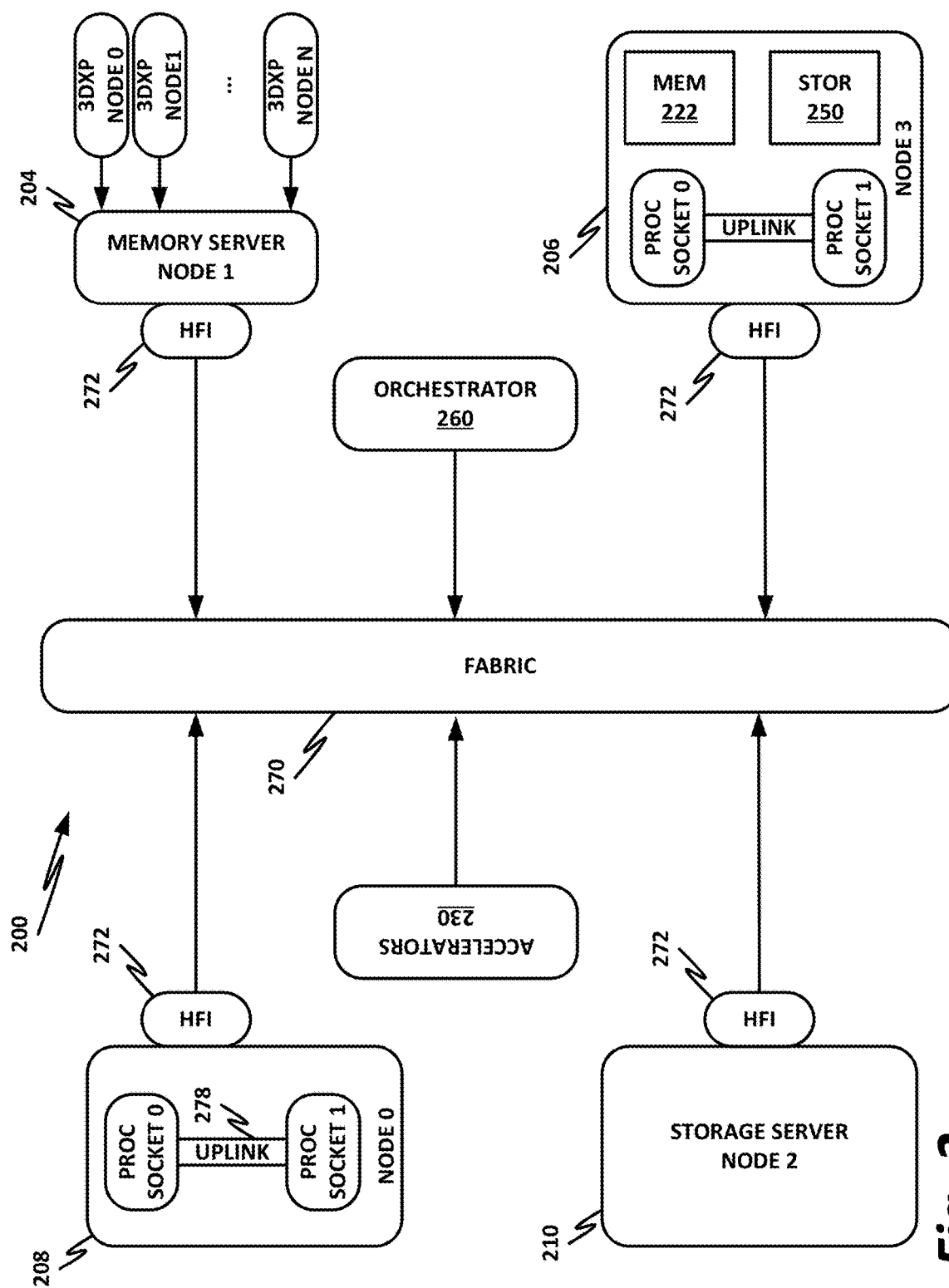
FIG. 2 is a block diagram of selected components of an end-user computing device, according to one or more examples of the present specification.

FIG. 2 is a block diagram of an end-user computing device 200, according to one or more examples of the present specification. Embodiments of computing device 200 disclosed herein may be adapted or configured to interoperate with protected runtime mode according to the teachings of the present specification. Computing device 200 may provide, as appropriate, cloud service, high-performance computing, telecommunication services, enterprise data center services, or any other compute services that benefit from a computing device 200.

In this example, a fabric 270 is provided to interconnect various aspects of computing device 200. Fabric 270 may be the same as fabric 170 of FIG. 1, or may be a different fabric. As above, fabric 270 may be provided by any suitable interconnect technology. In this example, Intel® Omni-Path™ is used as an illustrative and nonlimiting example.

As illustrated, computing device 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via an HFI 272. HFI 272 may connect to an Intel® Omni-Path™ fabric. In some examples, communication with fabric 270 may be tunneled, such as by providing UPI tunneling over Omni-Path™.

Because computing device 200 may provide many functions in a distributed fashion that in previous generations were provided onboard, a highly capable HFI 272 may be provided. HFI 272 may operate at speeds of multiple gigabits per second, and in some cases may be tightly coupled with node 0 208. For example, in some embodiments, the logic for HFI 272 is integrated directly with the processors on a system-on-a-chip. This provides very high speed communication between HFI 272 and the processor sockets, without the need for intermediary bus devices, which may introduce additional latency into the fabric. However, this is not to imply that embodiments where HFI 272 is provided over a traditional bus are to be excluded. Rather, it is expressly anticipated that in some examples, HFI 272 may be provided on a bus, such as a PCIe bus, which is a serialized version of PCI that provides higher speeds than traditional PCI. Throughout computing device 200, various nodes may provide different types of HFIs 272, such as onboard HFIs and plug-in HFIs. It should also be noted that certain blocks in a system on a chip may be provided as intellectual property (IP) blocks that can be "dropped" into an integrated circuit as a modular unit. Thus, HFI 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D XPoint (3DXP™) technology memory, which is byte-accessible like DRAM, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a HFI 272, which provides fast communication that makes these technologies possible.

By way of further illustration, node 3 206 is also depicted. Node 3 206 also includes a HFI 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

Computing device 200 may also include accelerators 230. These may provide various accelerated functions, including hardware or coprocessor acceleration for functions such as packet processing, encryption, decryption, compression, decompression, network security, or other accelerated functions in the data center. In some examples, accelerators 230 may include deep learning accelerators that may be directly attached to one or more cores in nodes such as node 0 208 or node 3 206. Examples of such accelerators can include, by way of nonlimiting example, Intel® QuickData Technology (QDT), Intel® QuickAssist Technology (QAT), Intel® Direct Cache Access (DCA), Intel® Extended Message Signaled Interrupt (MSI-X), Intel® Receive Side Coalescing (RSC), and other acceleration technologies.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
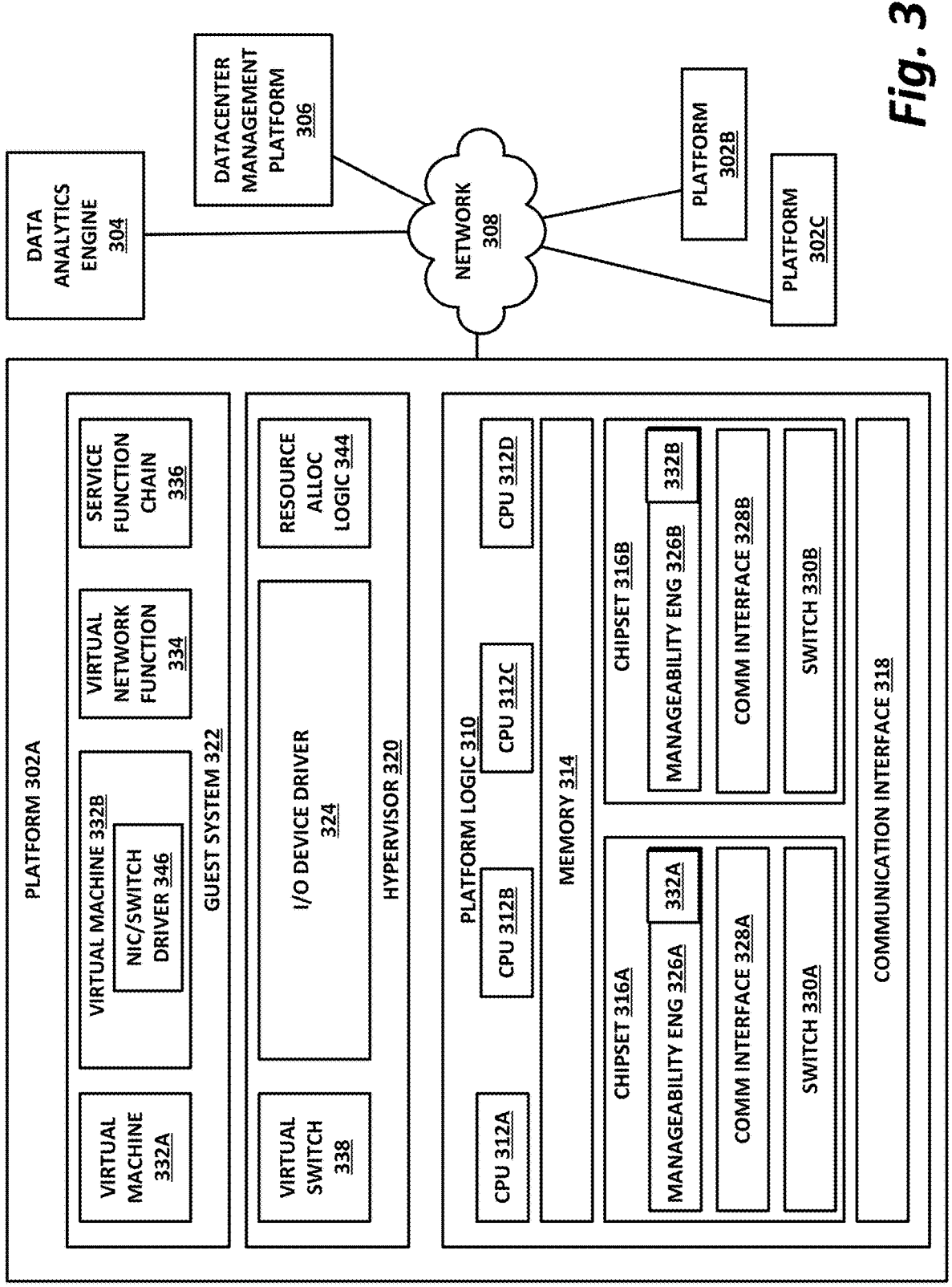
FIG. 3 is a block diagram of components of a computing platform, according to one or more examples of the present specification.

FIG. 3 illustrates a block diagram of components of a computing platform 302A, according to one or more examples of the present specification. Embodiments of computing platform 302A disclosed herein may be adapted or configured to interoperate with protected runtime mode according to the teachings of the present specification. In the embodiment depicted, platforms 302A, 302B, and 302C, along with a data center management platform 306 and data analytics engine 304 are interconnected via network 308. In other embodiments, a computer system may include any suitable number of (i.e., one or more) platforms. In some embodiments (e.g., when a computer system only includes a single platform), all or a portion of the system management platform 306 may be included on a platform 302. A platform 302 may include platform logic 310 with one or more central processing units (CPUs) 312, memories 314 (which may include any number of different modules), chipsets 316, communication interfaces 318, and any other suitable hardware and/or software to execute a hypervisor 320 or other operating system capable of executing workloads associated with applications running on platform 302. In some embodiments, a platform 302 may function as a host platform for one or more guest systems 322 that invoke these applications. Platform 302A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 306, hypervisor 320, or other operating system) of computer platform 302A may assign hardware resources of platform logic 310 to perform workloads in accordance with the stress information. In some embodiments, self-diagnostic capabilities may be combined with the stress monitoring to more accurately determine the health of the hardware resources. Each platform 302 may include platform logic 310. Platform logic 310 comprises, among other logic enabling the functionality of platform 302, one or more CPUs 312, memory 314, one or more chipsets 316, and communication interfaces 328. Although three platforms are illustrated, computer platform 302A may be interconnected with any suitable number of platforms. In various embodiments, a platform 302 may reside on a circuit board that is installed in a chassis, rack, or other suitable structure that comprises multiple platforms coupled together through network 308 (which may comprise, e.g., a rack or backplane switch).

CPUs 312 may each comprise any suitable number of processor cores and supporting logic (e.g., uncores). The cores may be coupled to each other, to memory 314, to at least one chipset 316, and/or to a communication interface 318, through one or more controllers residing on CPU 312 and/or chipset 316. In particular embodiments, a CPU 312 is embodied within a socket that is permanently or removably coupled to platform 302A. Although four CPUs are shown, a platform 302 may include any suitable number of CPUs.

Memory 314 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 314 may be used for short, medium, and/or long term storage by platform 302A. Memory 314 may store any suitable data or information utilized by platform logic 310, including software embedded in a computer readable medium, and/or encoded logic incorporated in hardware or otherwise stored (e.g., firmware). Memory 314 may store data that is used by cores of CPUs 312. In some embodiments, memory 314 may also comprise storage for instructions that may be executed by the cores of CPUs 312 or other processing elements (e.g., logic resident on chipsets 316) to provide functionality associated with the manageability engine 326 or other components of platform logic 310. A platform 302 may also include one or more chipsets 316 comprising any suitable logic to support the operation of the CPUs 312. In various embodiments, chipset 316 may reside on the same die or package as a CPU 312 or on one or more different dies or packages. Each chipset may support any suitable number of CPUs 312. A chipset 316 may also include one or more controllers to couple other components of platform logic 310 (e.g., communication interface 318 or memory 314) to one or more CPUs. In the embodiment depicted, each chipset 316 also includes a manageability engine 326. Manageability engine 326 may include any suitable logic to support the operation of chipset 316. In a particular embodiment, a manageability engine 326 (which may also be referred to as an innovation engine) is capable of collecting real-time telemetry data from the chipset 316, the CPU(s) 312 and/or memory 314 managed by the chipset 316, other components of platform logic 310, and/or various connections between components of platform logic 310. In various embodiments, the telemetry data collected includes the stress information described herein.

In various embodiments, a manageability engine 326 operates as an out-of-band asynchronous compute agent which is capable of interfacing with the various elements of platform logic 310 to collect telemetry data with no or minimal disruption to running processes on CPUs 312. For example, manageability engine 326 may comprise a dedicated processing element (e.g., a processor, controller, or other logic) on chipset 316, which provides the functionality of manageability engine 326 (e.g., by executing software instructions), thus conserving processing cycles of CPUs 312 for operations associated with the workloads performed by the platform logic 310. Moreover the dedicated logic for the manageability engine 326 may operate asynchronously with respect to the CPUs 312 and may gather at least some of the telemetry data without increasing the load on the CPUs.

A manageability engine 326 may process telemetry data it collects (specific examples of the processing of stress information will be provided herein). In various embodiments, manageability engine 326 reports the data it collects and/or the results of its processing to other elements in the computer system, such as one or more hypervisors 320 or other operating systems and/or system management software (which may run on any suitable logic such as system management platform 306). In particular embodiments, a critical event such as a core that has accumulated an excessive amount of stress may be reported prior to the normal interval for reporting telemetry data (e.g., a notification may be sent immediately upon detection).

Additionally, manageability engine 326 may include programmable code configurable to set which CPU(s) 312 a particular chipset 316 may manage and/or which telemetry data may be collected.

Chipsets 316 also each include a communication interface 328. Communication interface 328 may be used for the communication of signaling and/or data between chipset 316 and one or more I/O devices, one or more networks 308, and/or one or more devices coupled to network 308 (e.g., system management platform 306). For example, communication interface 328 may be used to send and receive network traffic such as data packets. In a particular embodiment, a communication interface 328 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 316 (e.g., manageability engine 326 or switch 330) and another device coupled to network 308. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 328 may allow communication of data (e.g., between the manageability engine 326 and the data center management platform 306) associated with management and monitoring functions performed by manageability engine 326. In various embodiments, manageability engine 326 may utilize elements (e.g., one or more NICs) of communication interfaces 328 to report the telemetry data (e.g., to system management platform 306) in order to reserve usage of NICs of communication interface 318 for operations associated with workloads performed by platform logic 310.

Switches 330 may couple to various ports (e.g., provided by NICs) of communication interface 328 and may switch data between these ports and various components of chipset 316 (e.g., one or more Peripheral Component Interconnect Express (PCIe) lanes coupled to CPUs 312). Switches 330 may be a physical or virtual (i.e., software) switch.

Platform logic 310 may include an additional communication interface 318. Similar to communication interfaces 328, communication interfaces 318 may be used for the communication of signaling and/or data between platform logic 310 and one or more networks 308 and one or more devices coupled to the network 308. For example, communication interface 318 may be used to send and receive network traffic such as data packets. In a particular embodiment, communication interfaces 318 comprise one or more physical NICs. These NICs may enable communication between any suitable element of platform logic 310 (e.g., CPUs 312 or memory 314) and another device coupled to network 308 (e.g., elements of other platforms or remote computing devices coupled to network 308 through one or more networks).

Platform logic 310 may receive and perform any suitable types of workloads. A workload may include any request to utilize one or more resources of platform logic 310, such as one or more cores or associated logic. For example, a workload may comprise a request to instantiate a software component, such as an I/O device driver 324 or guest system 322; a request to process a network packet received from a virtual machine 332 or device external to platform 302A (such as a network node coupled to network 308); a request to execute a process or thread associated with a guest system 322, an application running on platform 302A, a hypervisor 320 or other operating system running on platform 302A; or other suitable processing request.

A virtual machine 332 may emulate a computer system with its own dedicated hardware. A virtual machine 332 may run a guest operating system on top of the hypervisor 320. The components of platform logic 310 (e.g., CPUs 312, memory 314, chipset 316, and communication interface 318) may be virtualized such that it appears to the guest operating system that the virtual machine 332 has its own dedicated components.

A virtual machine 332 may include a virtualized NIC (vNIC), which is used by the virtual machine as its network interface. A vNIC may be assigned a media access control (MAC) address or other identifier, thus allowing multiple virtual machines 332 to be individually addressable in a network.

VNF 334 may comprise a software implementation of a functional building block with defined interfaces and behavior that can be deployed in a virtualized infrastructure. In particular embodiments, a VNF 334 may include one or more virtual machines 332 that collectively provide specific functionalities (e.g., wide area network (WAN) optimization, virtual private network (VPN) termination, firewall operations, load-balancing operations, security functions, etc.). A VNF 334 running on platform logic 310 may provide the same functionality as traditional network components implemented through dedicated hardware. For example, a VNF 334 may include components to perform any suitable NFV workloads, such as virtualized evolved packet core (vEPC) components, mobility management entities, 3rd Generation Partnership Project (3GPP) control and data plane components, etc.

SFC 336 is a group of VNFs 334 organized as a chain to perform a series of operations, such as network packet processing operations. Service function chaining may provide the ability to define an ordered list of network services (e.g. firewalls, load balancers) that are stitched together in the network to create a service chain.

A hypervisor 320 (also known as a virtual machine monitor) may comprise logic to create and run guest systems 322. The hypervisor 320 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 310. Services of hypervisor 320 may be provided by virtualizing in software or through hardware assisted resources that require minimal software intervention, or both. Multiple instances of a variety of guest operating systems may be managed by the hypervisor 320. Each platform 302 may have a separate instantiation of a hypervisor 320.

Hypervisor 320 may be a native or bare-metal hypervisor that runs directly on platform logic 310 to control the platform logic and manage the guest operating systems. Alternatively, hypervisor 320 may be a hosted hypervisor that runs on a host operating system and abstracts the guest operating systems from the host operating system. Hypervisor 320 may include a virtual switch 338 that may provide virtual switching and/or routing functions to virtual machines of guest systems 322. The virtual switch 338 may comprise a logical switching fabric that couples the vNICs of the virtual machines 332 to each other, thus creating a virtual network through which virtual machines may communicate with each other.

Virtual switch 338 may comprise a software element that is executed using components of platform logic 310. In various embodiments, hypervisor 320 may be in communication with any suitable entity (e.g., a SDN controller) which may cause hypervisor 320 to reconfigure the parameters of virtual switch 338 in response to changing conditions in platform 302 (e.g., the addition or deletion of virtual machines 332 or identification of optimizations that may be made to enhance performance of the platform).

Hypervisor 320 may also include resource allocation logic 344, which may include logic for determining allocation of platform resources based on the telemetry data (which may include stress information). Resource allocation logic 344 may also include logic for communicating with various components of platform logic 310 entities of platform 302A to implement such optimization, such as components of platform logic 310.

Any suitable logic may make one or more of these optimization decisions. For example, system management platform 306; resource allocation logic 344 of hypervisor 320 or other operating system; or other logic of computer platform 302A may be capable of making such decisions. In various embodiments, the system management platform 306 may receive telemetry data from and manage workload placement across multiple platforms 302. The system management platform 306 may communicate with hypervisors 320 (e.g., in an out-of-band manner) or other operating systems of the various platforms 302 to implement workload placements directed by the system management platform.

The elements of platform logic 310 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 302A may be coupled together in any suitable manner such as through one or more networks 308. A network 308 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 4:
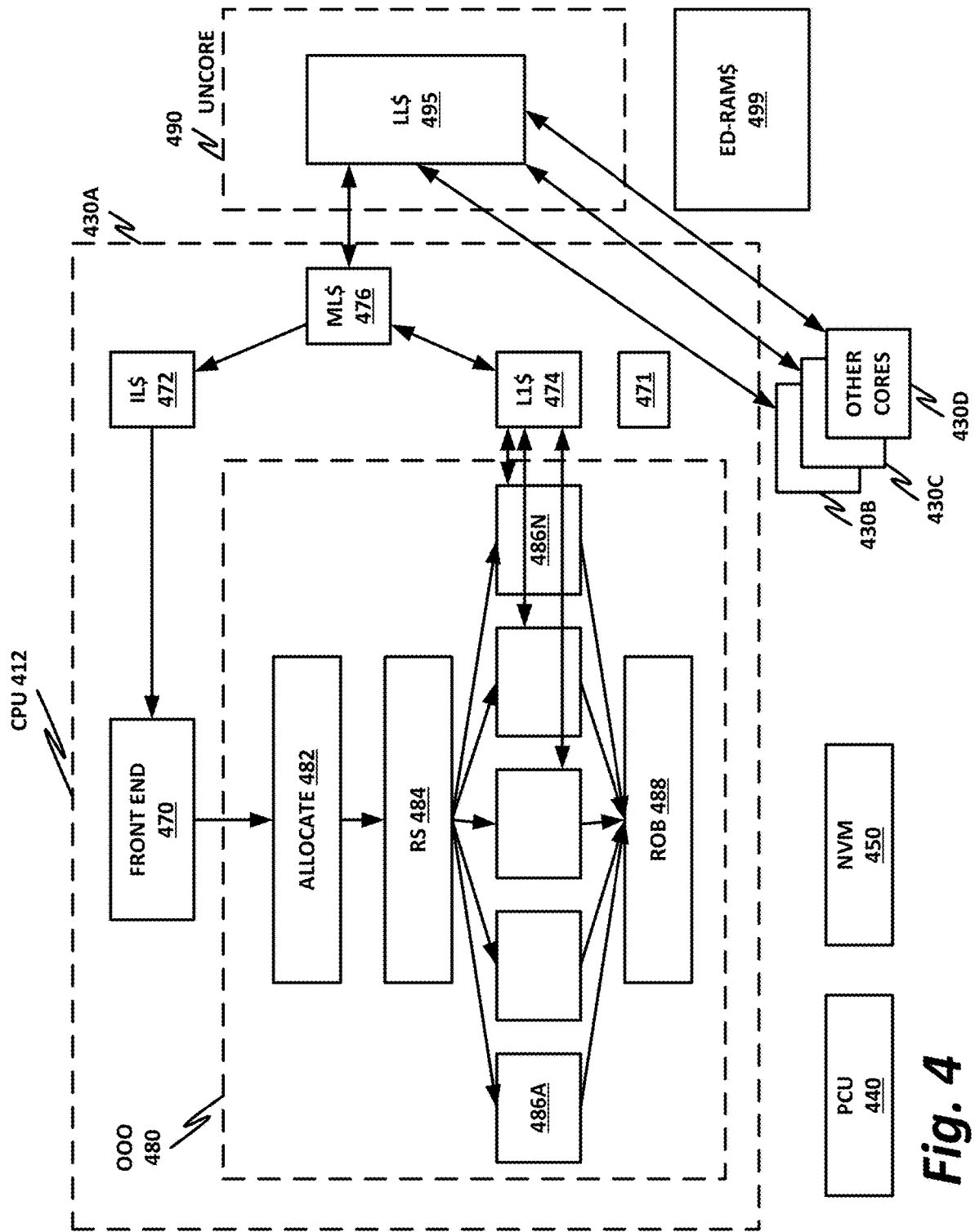
FIG. 4 is a block diagram of a central processing unit (CPU), according to one or more examples of the present specification.

FIG. 4 illustrates a block diagram of a central processing unit (CPU) 412, according to one or more examples of the present specification. Embodiments of CPU 412 disclosed herein may be adapted or configured to interoperate with protected runtime mode according to the teachings of the present specification. Although CPU 412 depicts a particular configuration, the cores and other components of CPU 412 may be arranged in any suitable manner. CPU 412 may comprise any processor or processing device, such as a microprocessor, an embedded processor, a digital signal processor (DSP), a network processor, an application processor, a co-processor, a system on a chip (SOC), or other device to execute code. CPU 412, in the depicted embodiment, includes four processing elements (cores 430 in the depicted embodiment), which may include asymmetric processing elements or symmetric processing elements. However, CPU 412 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 430A includes an out-of-order processor that has a front end unit 470 used to fetch incoming instructions, perform various processing (e.g. caching, decoding, branch predicting, etc.) and passing instructions/operations along to an out-of-order (OOO) engine. The OOO engine performs further processing on decoded instructions.

A front end 470 may include a decode module coupled to fetch logic to decode fetched elements. Fetch logic, in one embodiment, includes individual sequencers associated with thread slots of cores 430. Usually a core 430 is associated with a first ISA, which defines/specifies instructions executable on core 430. Often machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 430, in one embodiment, recognize the same ISA (or a subset thereof). Alternatively, in a heterogeneous core environment, a decoder of one or more cores (e.g., core 430B) may recognize a second ISA (either a subset of the first ISA or a distinct ISA).

In the embodiment depicted, the out-of-order engine includes an allocate unit 482 to receive decoded instructions, which may be in the form of one or more micro-instructions or uops, from front end unit 470, and allocate them to appropriate resources such as registers and so forth. Next, the instructions are provided to a reservation station 484, which reserves resources and schedules them for execution on one of a plurality of execution units 486A-486N. Various types of execution units may be present, including, for example, arithmetic logic units (ALUs), load and store units, vector processing units (VPUs), floating point execution units, among others. Results from these different execution units are provided to a reorder buffer (ROB) 488, which take unordered results and return them to correct program order.

In the embodiment depicted, both front end unit 470 and out-of-order engine 480 are coupled to different levels of a memory hierarchy. Specifically shown is an instruction level cache 472, that in turn couples to a mid-level cache 476, that in turn couples to a last level cache 495. In one embodiment, last level cache 495 is implemented in an on-chip (sometimes referred to as uncore) unit 490. Uncore 490 may communicate with system memory 499, which, in the illustrated embodiment, is implemented via embedded DRAM (eDRAM). The various execution units 486 within OOO engine 480 are in communication with a first level cache 474 that also is in communication with mid-level cache 476. Additional cores 430B-430D may couple to last level cache 495 as well.

In particular embodiments, uncore 490 may be in a voltage domain and/or a frequency domain that is separate from voltage domains and/or frequency domains of the cores. That is, uncore 490 may be powered by a supply voltage that is different from the supply voltages used to power the cores and/or may operate at a frequency that is different from the operating frequencies of the cores.

CPU 412 may also include a power control unit (PCU) 440. In various embodiments, PCU 440 may control the supply voltages and the operating frequencies applied to each of the cores (on a per-core basis) and to the uncore. PCU 440 may also instruct a core or uncore to enter an idle state (where no voltage and clock are supplied) when not performing a workload.

In various embodiments, PCU 440 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 440 may detect stress characteristics at any suitable interval.

In various embodiments, PCU 440 is a component that is discrete from the cores 430. In particular embodiments, PCU 440 runs at a clock frequency that is different from the clock frequencies used by cores 430. In some embodiments where the PCU is a microcontroller, PCU 440 executes instructions according to an ISA that is different from an ISA used by cores 430.

In various embodiments, CPU 412 may also include a nonvolatile memory 450 to store stress information (such as stress characteristics, incremental stress values, accumulated stress values, stress accumulation rates, or other stress information) associated with cores 430 or uncore 490, such that when power is lost, the stress information is maintained.

Figure 5:
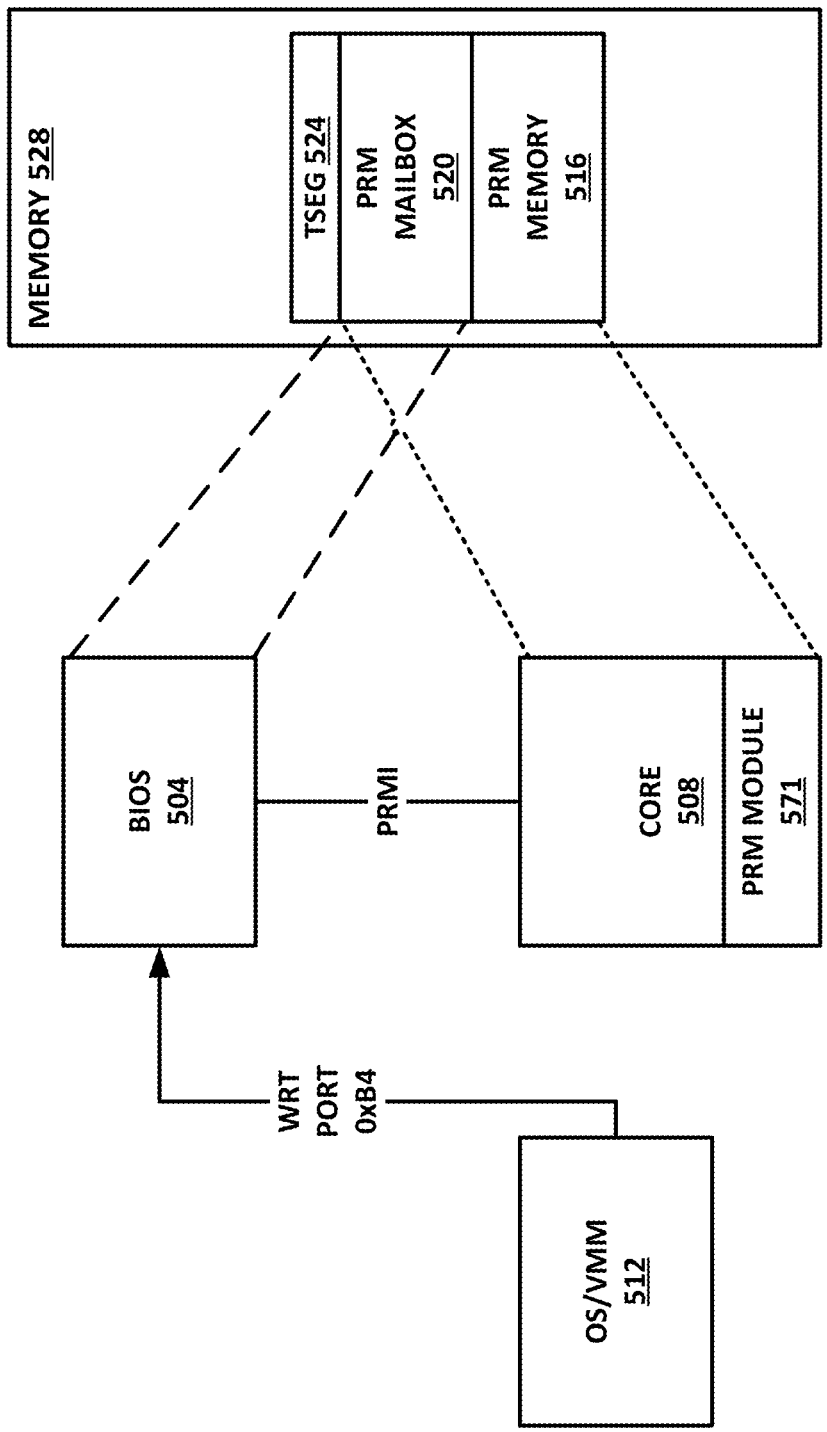
FIG. 5 is a signal flow diagram illustrating the use of protected runtime mode, according to one or more examples of the present specification.

FIG. 5 is a signal flow diagram illustrating the use of protected runtime mode, according to one or more examples of the present specification. As illustrated in FIG. 5, the OS or VMM 512 may enter PRM by writing to port 0xB4. Port 0xB4 is provided as a nonlimiting example only, and it should be understood that any other suitable method of entering PRM can be used.

When BIOS 504 is prepared to enter PRM, it may first write any necessary runtime parameters to a region of memory called PRM mailbox 520. PRM mailbox 520, in one embodiment, is located near or just below top segment (TSEG) 524.

The PRM mailbox may be similar to a system stack onto which parameters can be "pushed" for use during the PRM handler.

BIOS 504 then issues PRM interrupt (PRMI) to core 508. This causes core 508 to save its state, and to enter PRM. During PRM, core 508 has access only to the special PRM region of memory, which may be primed at boot time. During execution, the PRM handler may pop parameters off of PRM mailbox 520, and then operate within PRM memory 516.

Once execution of the PRM handler is finished, the previous state of the processor is restored, and execution may resume as normal.

In certain embodiments, the PRM mailbox 520 and PRM memory 516 may be referred to as the protected runtime RAM (PR RAM) range.

Upon entry to PRM, the processor may save information to a PRM save state. The PRM save state may include, by way of nonlimiting example:
  CR0, CR3, CR4
  ESP, EIP, EFLAGS
  Segments: FS, GS, GDTR, IDTR, ES, CS, SS, DS, LDTR, TR
  DR7, DEBUGCTLMSR
  General purpose (GP) registers.

While the system is in PRM, the following rules apply, by way of nonlimiting example:
  1. PRM is entered in 64-bit mode. Page tables are primed by the BIOS during boot, and are loaded in PRM memory 516 on entry to PRM.
  2. PRM can execute only within the PR RAM space.
  3. PRM may access data only within the PR RAM space and within PRM mailbox 520. The range for the PRM mailbox 520 may be programmed in a PR_Mailbox MSR.
  4. PRM may not access lock-bypass or SMM/SAI-protected registers. In other words, register access may be allowed at ring 0 level.

Upon exit from PRM, the processor state information disclosed above is restored, and execution may resume.

Figure 6:
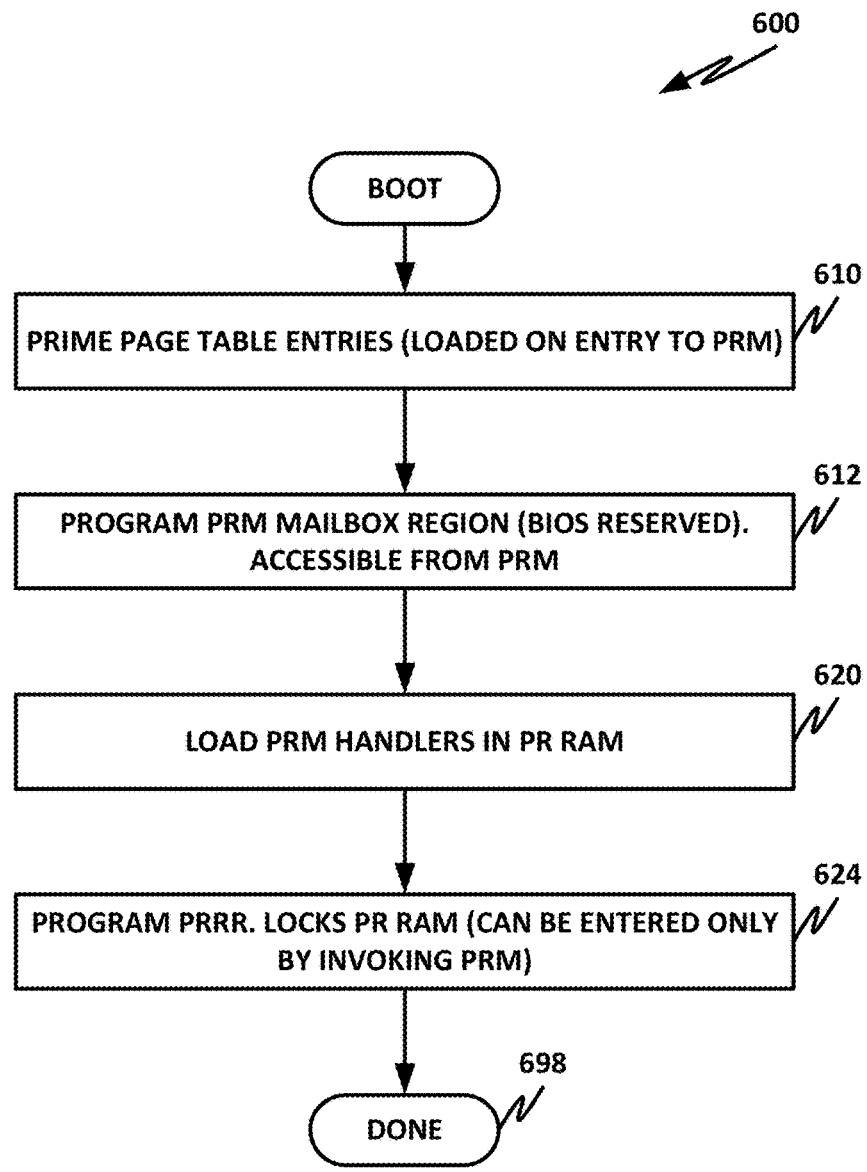
FIG. 6 is a flowchart of a method of priming the system for PRM at boot time, according to one or more examples of the present specification.

FIG. 6 is a flowchart of a method 600 of priming the system for PRM at boot time, according to one or more examples of the present specification.

Upon boot, at block 610, the system primes the page table entries that need to be loaded upon entry to PRM.

In block 612, the system programs a BIOS-reserved mailbox region for the PRM mailbox. This mailbox region is accessible by the PRM when the system enters PRM so that runtime parameters can be retrieved.

In block 620, the system loads the PRM handler into the PRM memory region, also known as PR RAM.

In block 624, the system programs the PRRR. This locks the PR RAM region. This region can be entered only by invoking a PRMI, and while in PRM, the system may access only this memory region.

In block 698, the PRM handler is programmed and ready, and the method is done.

FIGS. 7-8 are block diagrams of PRRR registers, according to one or more examples of the present specification.

FIG. 7 illustrates an IA32_PRRR_PHYSBASE register 700. FIG. 8 illustrates IA32_PRRR_PHYSMASK register 800.

The base and mask registers for PRRR follow the standard MTRR/SMRR model in one embodiment. The BIOS may program the register as part of the platform initialization sequence. Once the register is programmed, the PR RAM range is protected and can only be accessed by entering PRM.

Before programming PRRR, the BIOS may set the mailbox range in a package scoped MSR. This mailbox range may be BIOS-reserved and can be used for parameter passing between the PRM handlers and the code that invokes the PRM handler. In an embodiment, the platform communication channel range can be set as the mailbox range for establishing this communication mailbox.

Both register 700 and register 800 are 64-bit registers.

For register 700, bits 0 through 7 are for type 704, which is the memory type for the range.

Bits 8 through 11 are unused.

Bits 12 through 31 are physbase 708, the base address of the range.

Bits 32 through 63 are reserved.

For register 800, bits 0 through 10 may be reserved.

Bit 11 is a valid bit 804. This indicates whether the mask is valid.

Bits 12 through 32 are a range mask to set the range of the PRRR.

Bits 32 through 63 are reserved.

Figure 9:
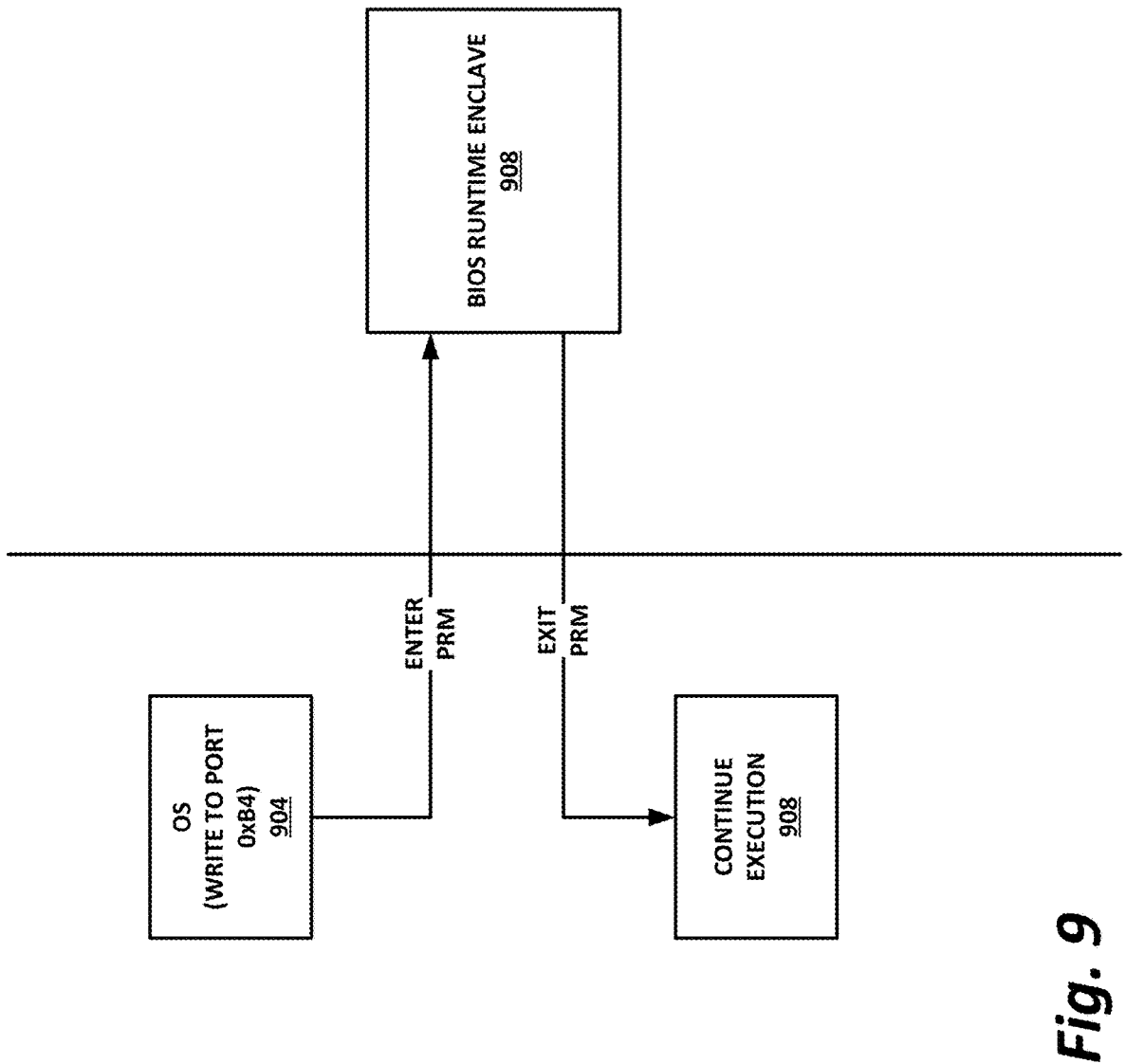
FIG. 9 is a block diagram illustrating invoking of and use of protected runtime mode (PRM), according to one or more examples of the present specification.

FIG. 9 is a block diagram illustrating invoking of and use of PRM, according to one or more examples of the present specification.

At block 904, the operating system may write necessary parameters to the PRM mailbox so that the PRM handler has the appropriate parameters to operate on. Thereafter, VMM writes to port 0xB4, which causes the system to enter PRM. Note that in PRM, only the core that is running this thread needs to be paused.

After the OS writes to port 0xB4, the system enters PRM in block 908, which is a BIOS runtime enclave. As illustrated in this figure, BIOS runtime enclave 908 may be firewalled off from the rest of the system. BIOS runtime enclave 908 has exclusive access to the PR RAM, and has access only to the PR RAM. BIOS runtime enclave 908 runs the PRM handler with any parameters that were written to the PRM mailbox region.

When the PRM handler is finished, the system exits PRM, and in block 908, execution continues.

Note that the PRM is primed during boot, and once set, can be entered only by invoking the PRM entry. For example, this can be accomplished by writing to port 0xB4 as illustrated in FIG. 9.

The PRM provides an isolated platform runtime environment. Platform firmware, including ACPI/ASL code, can invoke PRM to implement complex algorithms such as address translation in a more friendly, high-level language (for example, C or similar), rather than needing to invoke SMM.

Figure 10:
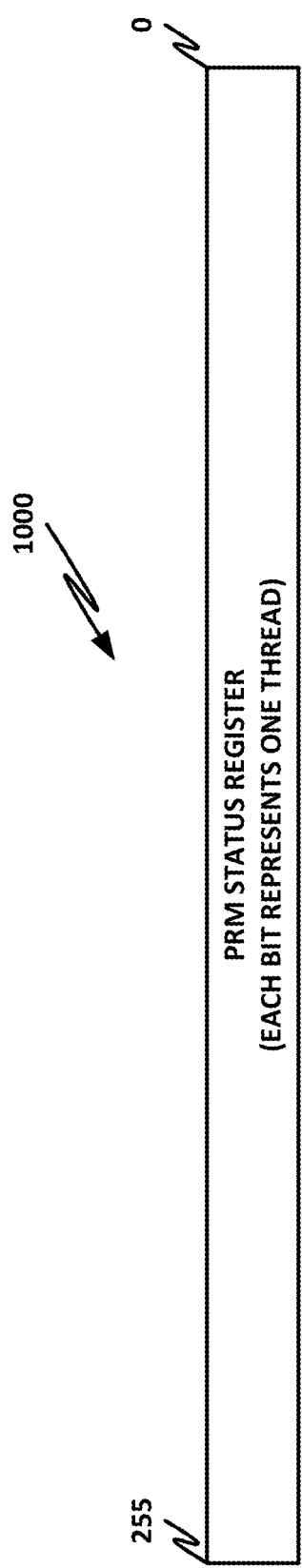
FIG. 10 is a block diagram of a PRM status register, according to one or more examples of the present specification.

FIG. 10 is a block diagram of a PRM status register 1000, according to one or more examples of the present specification.

PRM status register 1000 in one example is a 256-bit register, where each bit represents one thread. For example, bit 0 may represent core 0/thread 0, bit 1 may represent core 0/thread 1, bit 2 may represent core 1/thread 0, and so on.

Note that PRM may execute as a single thread. to identify the thread that is executing PRM mode, the PRM status register is defined as illustrated in FIG. 10. The operating system power management (OSPM) or VMM may query this packet scoped MSR to determine which thread is in PRM.

This provides the OS or VMM scheduler a mechanism to query the status of a temporarily unresponsive thread that is in PRM, and thus avoids a panic response.

To avoid concurrency issues, PRM code may not perform an access that causes concurrency issues with the OS or VMM. This may include index or data pair accessing (e.g., port 70 or 71) using ASL Mutex.

Embodiments of the PRM may be useful in providing maintenance and high-availability in a data center. For example, if a software thread encounters an exception condition that may be caused by a bad memory block, then PRM can be used to pause the thread and identify and isolate the bad memory block. Once the memory block is identified, a notification can be sent to an orchestrator or other management entity, so that a notification can be provided to a maintainer that the memory needs to be replaced. In the meantime, the memory block may be marked as bad so that it is no longer used. Thus, the thread that encounters the bad memory block may have an unrecoverable error, and the thread may fail. However, the entire hardware platform does not need to be paused while that thread enters PRM to determine the error. Because it is assumed that the thread that encountered the exception condition owns the bad memory block, pausing that thread may be sufficient to ensure that the bad memory block is isolated and reparative action can be taken. Note that many other uses for PRM are available, and the present example is meant to be nonlimiting and illustrative.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other non-volatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a processor, comprising: a protected runtime mode (PRM) module to receive a PRM interrupt and to: suspend operation of a software task executing on the processor; save processor state information; place the microprocessor into PRM; access a PRM handler in a designated PRM memory region, wherein the PRM handler comprises a platform specific task; restore the processor state; and resume operation of the software task.

Example 2 includes the processor of example 1, wherein accessing the PRM handler comprises accessing a PRM mailbox region comprising parameters for the PRM handler.

Example 3 includes the processor of example 1, wherein suspending operation of the software task comprises suspend only the core operating the software task.

Example 4 includes the processor of example 1, wherein suspending operation of the software task comprises suspending only the thread operating the software task.

Example 5 includes the processor of example 1, wherein accessing the PRM handler comprises blocking access to all system memory except for the PRM memory region.

Example 6 includes the processor of example 1, wherein the PRM memory region is defined by a PRM physical base register and a PRM mask register.

Example 7 includes the processor of example 1, wherein the PRM module is to update a PRM status register.

Example 8 includes the processor of example 1, wherein the PRM status register is a 256-bit status register comprising a single bit flag per thread.

Example 9 includes the processor of example 1, wherein the PRM module comprises microcode.

Example 10 includes the processor of example 1, wherein the PRM module comprises hardware instructions.

Example 11 includes the processor of example 1, wherein the PRM module comprises an intellectual property block.

Example 12 includes the processor of example 1, wherein the PRM module comprises an application-specific integrated circuit, a field-programmable gate array, or a coprocessor.

Example 13 includes a computing system, comprising: a basic input/output system (BIOS); a processor comprising a protected runtime mode (PRM) module to receive a PRM interrupt from the BIOS and to: suspend operation of a software task executing on the processor; save processor state information; place the microprocessor into PRM; access a PRM handler in a designated PRM memory region, wherein the PRM handler comprises a platform specific task; restore the processor state; and resume operation of the software task.

Example 14 includes the computing system of example 13, wherein the BIOS is to issue the PRM interrupt responsive to a write to a port by an operating system of the computing system.

Example 15 includes the computing system of example 14, wherein the port is 0xB4.

Example 16 includes the computing system of example 13, wherein the PRM handler is visible to an operating system of the computing system.

Example 17 includes the computing system of example 13, wherein accessing the PRM handler comprises accessing a PRM mailbox region comprising parameters for the PRM handler.

Example 18 includes the computing system of example 13, wherein suspending operation of the software task comprises suspend only the core operating the software task.

Example 19 includes the computing system of example 13, wherein suspending operation of the software task comprises suspending only the thread operating the software task.

Example 20 includes the computing system of example 13, wherein accessing the PRM handler comprises blocking access to all system memory except for the PRM memory region.

Example 21 includes the computing system of example 13, wherein the PRM memory region is defined by a PRM physical base register and a PRM mask register.

Example 22 includes the computing system of example 13, wherein the PRM module is to update a PRM status register.

Example 23 includes the computing system of example 13, wherein the PRM status register is a 256-bit status register comprising a single bit flag per thread.

Example 24 includes the computing system of example 13, wherein the PRM module comprises microcode.

Example 25 includes the computing system of example 13, wherein the PRM module comprises hardware instructions.

Example 26 includes the computing system of example 13, wherein the PRM module comprises an intellectual property block.

Example 27 includes the computing system of example 13, wherein the PRM module comprises an application-specific integrated circuit, a field-programmable gate array, or a co-processor.

Example 27 includes the computing system of example 13, further comprising a virtual machine manager.

Example 27 includes the computing system of example 13, further comprising a containerization host.

Example 28 includes one or more tangible, non-transitory computer-readable mediums having stored thereon instructions to provide a protected runtime mode (PRM) module, the PRM module to: suspend operation of a software task executing on the processor; save processor state information; place the microprocessor into PRM; access a PRM handler in a designated PRM memory region, wherein the PRM handler comprises a platform specific task; restore the processor state; and resume operation of the software task.

Example 29 includes the one or more tangible, non-transitory computer-readable mediums of example 28, wherein accessing the PRM handler comprises accessing a PRM mailbox region comprising parameters for the PRM handler.

Example 30 includes the one or more tangible, non-transitory computer-readable mediums of example 28, wherein suspending operation of the software task comprises suspend only the core operating the software task.

Example 31 includes the one or more tangible, non-transitory computer-readable mediums of example 28, wherein suspending operation of the software task comprises suspending only the thread operating the software task.

Example 32 includes the one or more tangible, non-transitory computer-readable mediums of example 28, wherein accessing the PRM handler comprises blocking access to all system memory except for the PRM memory region.

Example 33 includes the one or more tangible, non-transitory computer-readable mediums of example 28, wherein the PRM memory region is defined by a PRM physical base register and a PRM mask register.

Example 34 includes the one or more tangible, non-transitory computer-readable mediums of example 28, wherein the PRM module is to update a PRM status register.

Example 35 includes the one or more tangible, non-transitory computer-readable mediums of example 28, wherein the PRM status register is a 256-bit status register comprising a single bit flag per thread.

Example 36 includes the one or more tangible, non-transitory computer-readable mediums of example 28, wherein the instructions comprise microcode.

Example 37 includes the one or more tangible, non-transitory computer-readable mediums of example 28, wherein the instructions comprise hardware instructions.

Example 38 includes the one or more tangible, non-transitory computer-readable mediums of example 28, wherein the instructions comprise an intellectual property block.

Example 39 includes the one or more tangible, non-transitory computer-readable mediums of example 28, wherein the instructions comprise instructions to program an application-specific integrated circuit, a field-programmable gate array, or a co-processor.

Example 40 includes a computer-implemented method of providing a protected runtime mode (PRM) for a processor, comprising suspending operation of a software task executing on the processor; saving processor state information; placing the microprocessor into PRM; accessing a PRM handler in a designated PRM memory region, wherein the PRM handler comprises a platform specific task; restoring the processor state; and resuming operation of the software task.

Example 41 includes the method of example 40, wherein accessing the PRM handler comprises accessing a PRM mailbox region comprising parameters for the PRM handler.

Example 42 includes the method of example 40, wherein suspending operation of the software task comprises suspend only the core operating the software task.

Example 43 includes the method of example 40, wherein suspending operation of the software task comprises suspending only the thread operating the software task.

Example 44 includes the method of example 40, wherein accessing the PRM handler comprises blocking access to all system memory except for the PRM memory region.

Example 45 includes the method of example 40, wherein the PRM memory region is defined by a PRM physical base register and a PRM mask register.

Example 46 includes the method of example 40, further comprising updating a PRM status register.

Example 47 includes the method of example 40, wherein the PRM status register is a 256-bit status register comprising a single bit flag per thread.

Example 48 includes a processor comprising a PRM module to perform the method of any of examples 40-47.

Example 49 includes the processor of example 48, wherein the PRM module comprises microcode.

Example 50 includes the processor of example 48, wherein the PRM module comprises hardware instructions.

Example 51 includes the processor of example 48, wherein the PRM module comprises an intellectual property block.

Example 52 includes the processor of example 48, wherein the PRM module comprises an application-specific integrated circuit, a field-programmable gate array, or a co-processor.

Example 53 includes a computing system comprising a BIOS and the processor of example 48.

Example 54 includes the computing system of example 53, wherein the BIOS is to issue the PRM interrupt responsive to a write to a port by an operating system of the computing system.

Example 55 includes the computing system of example 54, wherein the port is 0xB4.

Example 56 includes the computing system of example 53, wherein the PRM handler is visible to an operating system of the computing system.

What is claimed is:

1. A processor, comprising:
    a protected runtime mode (PRM) circuit module to receive a PRM interrupt and to:
    suspend operation of a core operating a software task executing on the processor without suspending other cores of the processor;
    save processor state information;
    place the processor into PRM;
    access a PRM handler in a designated PRM memory region, wherein the PRM handler comprises a platform specific task;
    restore the processor state; and
    resume operation of the software task.

2. The processor of claim 1, wherein accessing the PRM handler comprises accessing a PRM mailbox region comprising parameters for the PRM handler.

3. The processor of claim 1, wherein accessing the PRM handler comprises blocking access to all system memory except for the designated PRM memory region.

4. The processor of claim 1, wherein the designated PRM memory region is defined by a PRM physical base register and a PRM mask register.

5. The processor of claim 1, wherein the PRM circuit is to update a PRM status register.

6. The processor of claim 5, wherein the PRM status register is a 256-bit status register comprising a single bit flag per thread.

7. The processor of claim 1, wherein the PRM circuit comprises microcode.

8. The processor of claim 1, wherein the PRM circuit comprises hardware instructions.

9. The processor of claim 1, wherein the PRM circuit comprises an intellectual property block.

10. The processor of claim 1, wherein the PRM circuit comprises an application-specific integrated circuit, a field-programmable gate array, or a co-processor.

11. A computing system, comprising:
    a basic input/output system (BIOS); and
    a multi-core processor comprising a protected runtime mode (PRM) circuit to receive a PRM interrupt from the BIOS and to:
    suspend operation of a software task executing on a core of the multi-core processor without suspending other cores of the multi-core processor;
    save processor state information;
    place the multi-core processor into PRM;
    access a PRM handler in a designated PRM memory region,
    wherein the PRM handler comprises a platform specific task;
    restore the processor state; and
    resume operation of the software task.

12. The computing system of claim 11, wherein the BIOS is to issue the PRM interrupt responsive to a write to a port by an operating system of the computing system.

13. The computing system of claim 12, wherein the port is $0xB_4$.

14. The computing system of claim 11, wherein the PRM handler is visible to an operating system of the computing system.

15. The computing system of claim 11, wherein accessing the PRM handler comprises accessing a PRM mailbox region comprising parameters for the PRM handler.

16. The computing system of claim 11, wherein suspending operation of the software task comprises suspending the core operating the software task.

17. The computing system of claim 11, wherein accessing the PRM handler comprises blocking access to all system memory except for the designated PRM memory region.

18. The computing system of claim 11, wherein the designated PRM memory region is defined by a PRM physical base register and a PRM mask register.

19. The computing system of claim 11, wherein the PRM circuit is to update a PRM status register.

20. The computing system of claim 19, wherein the PRM status register is a 256-bit status register comprising a single bit flag per thread.

21. The computing system of claim 11, further comprising a virtual machine manager (VMM).

22. The computing system of claim 11, further comprising a containerization host.

23. One or more tangible, non-transitory computer-readable media having stored thereon instructions to provide a protected runtime mode (PRM) for a multi-core processor, the instructions to:
    suspend operation of a software task executing on a core of the multi-core processor, without suspending other cores of the multi-core processor;
    save processor state information;
    place the processor into PRM;
    access a PRM handler in a designated PRM memory region, wherein the PRM handler comprises a platform specific task;
    restore the processor state; and
    resume operation of the software task.

24. The one or more tangible, non-transitory computer-readable media of claim 23, wherein accessing the PRM handler comprises accessing a PRM mailbox region comprising parameters for the PRM handler.

* * * * *

UNITED STATES PATENT AND TRADEMARK OFFICE
CERTIFICATE OF CORRECTION

PATENT NO. : 11,138,072 B2
APPLICATION NO. : 15/852021
DATED : October 5, 2021
INVENTOR(S) : Mohan J. Kumar et al.

Page 1 of 1

It is certified that error appears in the above-identified patent and that said Letters Patent is hereby corrected as shown below:

In the Claims

In Column 25, Claim 1, Line 19, delete "circuit module" and insert -- circuit --, therefor.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*